Jan. 13, 1959  S. O. B. LJUNGBO  2,868,675
PRODUCTION OF NETS, KNITTED FABRICS AND THE LIKE
FROM SINGLE-FILAMENT POLYAMIDE THREADS
Filed July 20, 1956
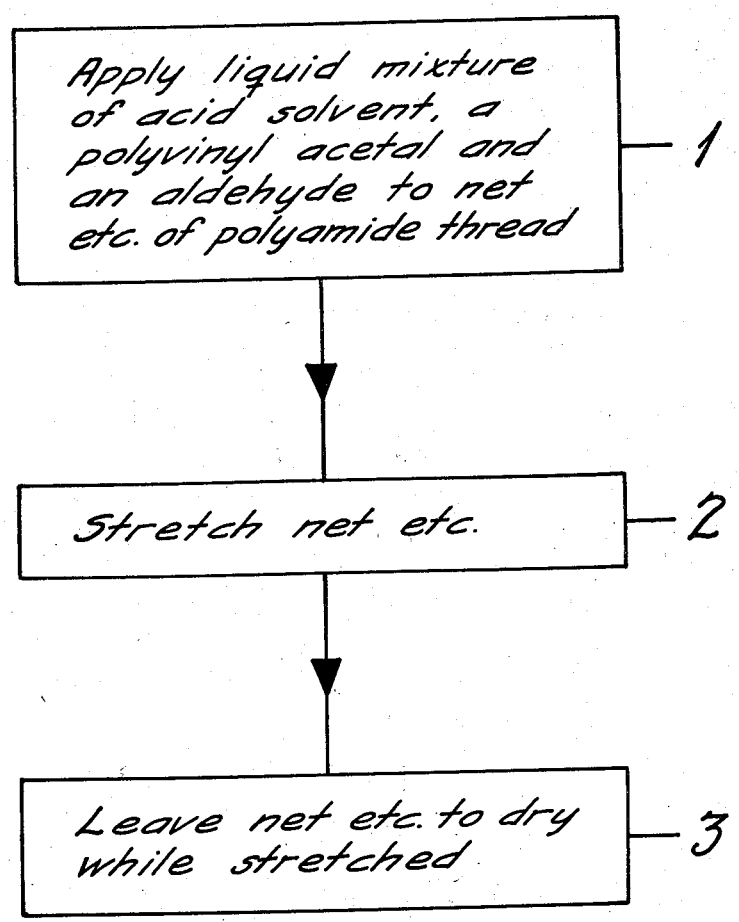
INVENTOR
SVEN OLOF BIRGER LJUNGBO
BY Irwin S. Thompson
ATTY.

United States Patent Office 2,868,675
Patented Jan. 13, 1959

2,868,675

PRODUCTION OF NETS, KNITTED FABRICS AND THE LIKE FROM SINGLE-FILAMENT POLYAMIDE THREADS

Sven Olof Birger Ljungbo, Stockholm, Sweden

Application July 20, 1956, Serial No. 599,023

Claims priority, application Sweden July 21, 1955

4 Claims. (Cl. 117—138.8)

The present invention generally relates to the production of nets, knitted fabrics and the like from single-filament polyamide threads, and more specifically relates to an improved method of obtaining fixed knots and crossings between the threads in such nets or fabrics.

It has been proposed heretofore to treat single-filament polyamide threads, or nets, knitted articles or the like manufactured from single-filament polyamide threads, with a solution consisting of at least one solvent for the plastic (polyamide) and, dissolved in said solvent, a polymer which is insoluble in water and miscible with the plastic concerned. In addition, the solution may contain one or more liquids (diluents) miscible with the solvent concerned but incapable of dissolving the plastic. As solvents for the plastic concerned acids, phenols, ethylene chlorohydrin, etc., have been proposed, inter alia. Among these solvents, the acids have been found to yield the most favorable results. If, as has also been proposed, the polymer is a polyvinyl acetal, then the use of acids as solvents is accompanied by a certain hydrolysis of the acetal causing the latter to be sensitive to water and the strength of the fixation of the knots and crossings to be considerably reduced when the finished article is wetted.

In accordance with the present invention, however, it has been found to be possible to overcome this drawback by adding to the solution used an aldehyde. This aldehyde may be of the same kind as that of the polyvinyl acetal used, or it may be an aldehyde of a different kind. Suitable polyvinyl acetals are polyvinyl formal, polyvinyl acetal and polyvinyl butyral.

The following examples illustrate the invention in a non-limitative manner:

Example 1

A solution is prepared from:

15% polyvinyl formal
9% acetaldehyde
25% acetone
51% formic acid

This solution is applied to polyamide threads and is allowed to dry on the threads. The polyamide threads thus treated can then be used in the production of fishing nets. The net produced is then subjected to treatment with a solvent for the polyvinyl formal used, for instance with ethyl lactate, a mixture of ethyl alcohol and toluene, or the like, causing the polyvinyl acetal to be partially dissolved and to effect bonding at the knots or crossings. As an alternative, the fishing net may be pre-manufactured from non-treated threads, after which the net is stretched out in a frame and has the solution applied to it, whereupon the net is left to dry. In this case no after-treatment with a polyvinyl acetal solvent is necessary.

Example 2

A solution is prepared from:

15% polyvinyl butyral
16.5% butyraldehyde
17.5% acetone
51% formic acid

This solution is used in a manner similar to that of Example 1.

In both cases securely fixed knots and crossings will result which will not be weakened when subjecting the articles to wetting.

The accompanying drawing contains a flow sheet illustrating the process of this invention.

What I claim is:

1. A process for treating single-filament polyamide threads and nets and knitted fabrics made therefrom to obtain slip-free knots and crossings between the threads, which comprises applying to said threads, nets and knitted fabrics a solution containing an acid capable of dissolving said polyamide, a polyvinyl acetal and an aldehyde selected from the group consisting of formaldehyde, acetaldehyde and butyraldehyde.

2. A process as claimed in claim 1, in which said polyvinyl acetal is selected from the group consisting of polyvinyl formal, polyvinyl acetal and polyvinyl butyral.

3. A process as claimed in claim 1, wherein the aldehyde is the same as that contained in the acetal used.

4. A process as claimed in claim 1, wherein said solution contains also a liquid diluent miscible with said acid solvent but incapable of dissolving said polyamide.

References Cited in the file of this patent

UNITED STATES PATENTS

| 2,251,508 | Watson | Aug. 5, 1941 |
| 2,590,586 | Thompson et al. | Mar. 25, 1952 |
| 2,639,249 | Gurin et al. | May 19, 1953 |
| 2,790,736 | McLaughlin et al. | Apr. 30, 1957 |

FOREIGN PATENTS

| 391,480 | Great Britain | Apr. 21, 1933 |
| 685,623 | Great Britain | Jan. 7, 1953 |